United States Patent
Dzikowska et al.

(10) Patent No.: US 10,002,157 B2
(45) Date of Patent: Jun. 19, 2018

(54) AUTOMATIC CONFLICT RESOLUTION DURING SOFTWARE CATALOG IMPORT

(71) Applicant: International Business Machines Corporation, Armonk, NY (US)

(72) Inventors: Ilona Dzikowska, Lezajsk (PL); Cezary P. Gorka, Cracow (PL); Grzegorz K. Lech, Cieszyn (PL); Agnieszka G. Matecka, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 14/739,070

(22) Filed: Jun. 15, 2015

(65) Prior Publication Data

US 2016/0364432 A1    Dec. 15, 2016

(51) Int. Cl.
*G06F 17/00* (2006.01)
*G06F 17/30* (2006.01)

(52) U.S. Cl.
CPC ...... *G06F 17/30371* (2013.01); *G06F 17/303* (2013.01); *G06F 17/3038* (2013.01)

(58) Field of Classification Search
None
See application file for complete search history.

(56) References Cited

U.S. PATENT DOCUMENTS

| | | | |
|---|---|---|---|
| 7,836,103 B2 | 11/2010 | Li et al. | |
| 8,527,544 B1 * | 9/2013 | Colgrove | G06F 3/0608 707/791 |
| 8,600,776 B2 * | 12/2013 | Raduchel | G06F 19/322 705/3 |
| 8,671,390 B2 | 3/2014 | Davydok et al. | |
| 9,619,616 B2 * | 4/2017 | Raduchel | G06F 19/323 |
| 9,697,091 B2 * | 7/2017 | Gordon | G06F 11/1469 |
| 2002/0124005 A1 * | 9/2002 | Matson | G06F 17/30893 |
| 2004/0003057 A1 * | 1/2004 | Broad | G06F 17/3056 709/219 |
| 2006/0095199 A1 * | 5/2006 | Lagassey | G07C 5/008 701/117 |

(Continued)

OTHER PUBLICATIONS

Andrew Lindley, "Database Preservation Evaluation Report—SIARD vs. CHRONOS", 2013.*

(Continued)

*Primary Examiner* — Hung Le
(74) *Attorney, Agent, or Firm* — Daniel R. Simek

(57) ABSTRACT

Aspects of the present invention disclose a method, computer program product, and system for managing conflicts in an import operation. The method includes one or more processors identifying a conflict in an import operation of an incoming set of data into an existing database, wherein the incoming set of data includes an incoming entry, and the existing database includes an existing entry that corresponds to the identified conflict. The method further includes one or more processors determining a probability to preserve the existing entry in the existing database based on a set of rules associated with the import operation. The method further includes one or more processors determining whether to overwrite the existing entry in the existing database with the incoming entry from the incoming set of data based on comparing the determined probability to a threshold probability.

20 Claims, 4 Drawing Sheets

(56) References Cited

U.S. PATENT DOCUMENTS

| | | | | |
|---|---|---|---|---|
| 2007/0050285 | A1* | 3/2007 | Freeman | G06Q 40/025 |
| | | | | 705/38 |
| 2007/0271258 | A1* | 11/2007 | Martin | G06F 17/30348 |
| 2008/0281822 | A1* | 11/2008 | Goradia | G06F 17/30569 |
| 2010/0070448 | A1* | 3/2010 | Omoigui | H01L 27/1463 |
| | | | | 706/47 |
| 2010/0318556 | A1* | 12/2010 | McKay | G06Q 10/10 |
| | | | | 707/769 |
| 2011/0145636 | A1* | 6/2011 | Schauser | G06F 11/0709 |
| | | | | 714/15 |
| 2012/0207449 | A1* | 8/2012 | Angquist | G11B 27/031 |
| | | | | 386/278 |
| 2012/0254113 | A1 | 10/2012 | Theroux et al. | |
| 2012/0310895 | A1* | 12/2012 | Hoog | G06F 17/30569 |
| | | | | 707/675 |
| 2013/0086006 | A1* | 4/2013 | Colgrove | G06F 17/30159 |
| | | | | 707/692 |
| 2013/0318029 | A1* | 11/2013 | Sridharan | G06Q 10/10 |
| | | | | 706/59 |
| 2015/0254150 | A1* | 9/2015 | Gordon | G06F 11/1662 |
| | | | | 714/6.3 |
| 2016/0085513 | A1* | 3/2016 | Dorfman | G06F 8/34 |
| | | | | 717/109 |
| 2016/0357644 | A1* | 12/2016 | Gordon | G06F 11/1662 |

OTHER PUBLICATIONS

"Developing an Electronic Records Preservation Strategy", Version 7, 2011.*

* cited by examiner

AUTOMATIC CONFLICT RESOLUTION DURING SOFTWARE CATALOG IMPORT

BACKGROUND OF THE INVENTION

The present invention relates generally to the field of software catalogs, and more particularly to conflict resolution when importing data into a software catalog.

A software catalog may be a portable representation of a knowledge base. Software catalogs can include information about software products and components, relationships among them, their signatures used for discovery, and their licensing properties. A software catalog may be a huge database with information from many data sources and software suppliers, also including custom-generated content. Software catalogs can have a variety of uses. For example, a software catalog may represent a knowledge base that is used for a discovery procedure of installed software. Such a knowledge base may be used by software scanners to discover installed software programs.

In computing centers, systems management tools are often used in order to properly track and manage hardware and software assets. On computer systems, a plurality of different software programs having different versions and/or releases that may be installed. In order to track installed software programs on a computer system, information about the installed software may be stored (e.g., in a database or in any other suitable form).

SUMMARY

Aspects of the present invention disclose a method, computer program product, and system for managing conflicts in an import operation. The method includes one or more processors identifying a conflict in an import operation of an incoming set of data into an existing database, wherein the incoming set of data includes an incoming entry and the existing database includes an existing entry that corresponds to the identified conflict. The method further includes one or more processors determining a probability to preserve the existing entry in the existing database based on a set of rules associated with the import operation. The method further includes one or more processors determining whether to overwrite the existing entry in the existing database with the incoming entry from the incoming set of data based on comparing the determined probability to a threshold probability.

In another aspect of the present invention, the method further includes, responsive to determining to overwrite the existing entry in the existing database with the incoming entry from the incoming set of data based on comparing the determined probability to the threshold probability, one or more processors importing the incoming entry from the incoming set of data into the existing database and overwriting the existing entry in the existing database with the incoming entry from the incoming set of data.

In yet another aspect of the present invention, the method further includes, responsive to determining to not overwrite the existing entry in the existing database with the incoming entry from the incoming set of data based on comparing the determined probability to the threshold probability, one or more processors preserving the existing entry in the existing database instead of utilizing the incoming entry from the incoming set of data.

DETAILED DESCRIPTION

Embodiments of the present invention allow for an automated resolution of conflicts that are detected during the import of data from a software catalog utilizing a customized set of rules. Each of the rules can contribute to the probability that, for a given conflict, the corresponding entry that is already existing in a target database will either be preserved or replaced.

Some embodiments of the present invention recognize that when a software catalog is being loaded into a database that already includes content, duplicates can occur because the duplicated items were generated independently (e.g., the duplicates had different corresponding IDs). Conflicts can occur when key properties (e.g., software names and versions) of content are the same in the imported and existing knowledge base, and a collision of values occurs. Some examples of conflicts include that the same signature may be used to identify different software products, that the same signature may be used on a different platform, that the same software release has a different parent version, and that the same software version has a different parent product.

Additional embodiments of the present invention recognize the importance of discovering and reporting such conflicts to avoid reporting duplicate software instances or incorrect license counting. Further embodiments of the present invention recognize that manually identifying and/or selecting conflicts and resolving the conflicts can utilize a large amount of effort.

Implementation of embodiments of the invention may take a variety of forms, and exemplary implementation details are discussed subsequently with reference to the Figures.

Figure 1:
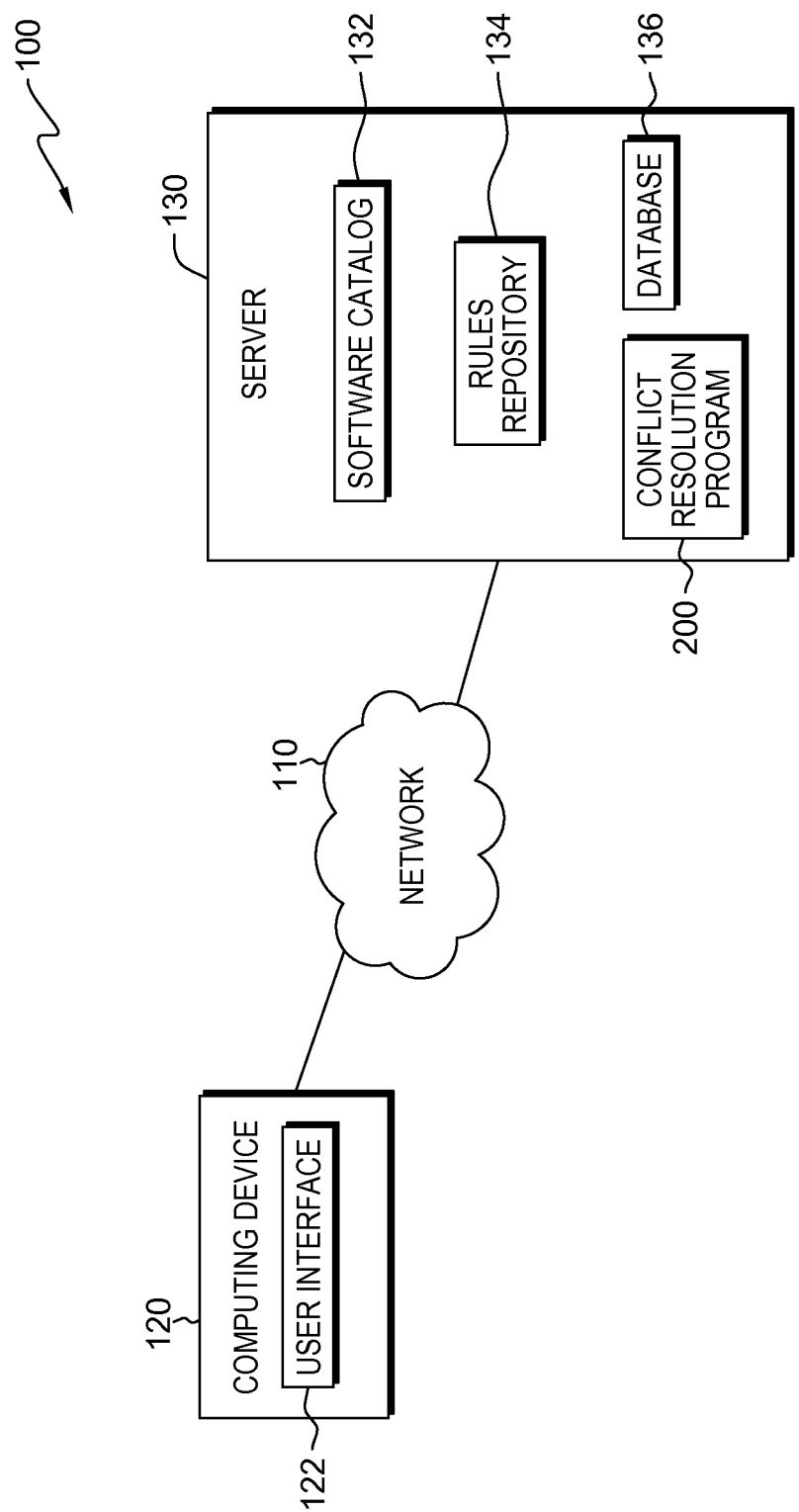
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes computing device 120 and server 130, interconnected over network 110. In the depicted embodiment, computing device 120 and server 130 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols that will support communications between computing device 120 and server 130, in accordance with embodiments of the present invention.

In various embodiments of the present invention, computing device 120 may be a workstation, personal computer, personal digital assistant, mobile phone, or any other device capable of executing computer readable program instructions, in accordance with embodiments of the present invention. In general, computing device 120 is representative of any electronic device or combination of electronic devices capable of executing computer readable program instructions. Computing device 120 may include components as depicted and described in further detail with respect to FIG. 4, in accordance with embodiments of the present invention. In an example embodiment, computing device 120 can communicate with server 130 to access data and/or provide input.

Computing device 120 includes user interface 122. User interface 122 is a program that provides an interface between a user of computing device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

In example embodiments, server 130 can be a desktop computer, a computer server, or any other computer systems known in the art. In certain embodiments, server 130 represents computer systems utilizing clustered computers and components (e.g., database server computers, application server computers, etc.) that act as a single pool of seamless resources when accessed by elements of data processing environment 100 (e.g., computing device 120). In general, server 130 is representative of any electronic device or combination of electronic devices capable of executing computer readable program instructions. Server 130 may include components as depicted and described in further detail with respect to FIG. 4, in accordance with embodiments of the present invention.

Server 130 includes software catalog 132, rules repository 134, database 136, and conflict resolution program 200. In various embodiments, server 130 can be any computing device capable of operating conflict resolution program 200. In another embodiment, database 136 may be located on a computing device other than server 130 (e.g., a database server or another computing device), provided that database 136 is accessible by server 130. For example, server 130 can manage deployment (e.g., import operations) of software catalog 132 in data processing environment 100, such as importing software catalog 132 into database 136 (e.g., whether database 136 is on server 130 or located off server 130 but accessible by server 130). Conflict resolution program 200 manages conflicts in an import operation for a software catalog, in accordance with embodiments of the present invention. For example, server 130 utilizes conflict resolution program 200 to manage importing software catalog 132 in to database 136.

In various embodiments, software catalog 132 can be a collection of information about software that may be installed on a computer system or that may have to be installed on a computer system (e.g., server 130). Software catalog 132 can be a portable representation of a knowledge base, including information (e.g., metadata) about software products and components, relationships among the software products and components, signatures used for discovery, and licensing properties. In one embodiment, software catalog 132 can be a database that includes information from multiple data sources and suppliers and may also comprise custom-generated content (e.g., a relational database, eXtensible Markup Language (XML) files, etc.).

Rules repository 134 includes rules that server 130 and conflict resolution program 200 utilize to identify and manage conflicts during a merge operation. In one embodiment, rules repository 134 includes rules that can denote a predefined set of conditions to utilize to make a decision on a given conflict of an input operation. In various embodiments, conflict resolution program 200 can utilize rules either alone or in combination. Rules repository 134 is an organized collection of data and can be implemented with any type of storage device, for example, persistent storage 408, which is capable of storing data that may be accessed and utilized by server 130 and computing device 120, such as a database server, a hard disk drive, or a flash memory. In other embodiments, rules repository 134 can represent multiple storage devices and/or multiple repositories within server 130.

Database 136 is an organized collection of data and can be implemented with any type of storage device, for example, persistent storage 408, which is capable of storing data that may be accessed and utilized by server 130 and computing device 120, such as a database server, a hard disk drive, or a flash memory. In other embodiments, database 136 can represent multiple storage devices and/or multiple databases within server 130. In an example embodiment, database 136 is a knowledge base that includes existing software and information. For example, database 136 is the recipient of the import of software catalog 132. Server 130 utilizes conflict resolution program 200 to manage the import operation and conflicts between data already existing in database 136 and data to import from software catalog 132. In another embodiment, database 136 can include a software catalog that can be implemented as any kind of database or as a group of XML files.

Figure 2:
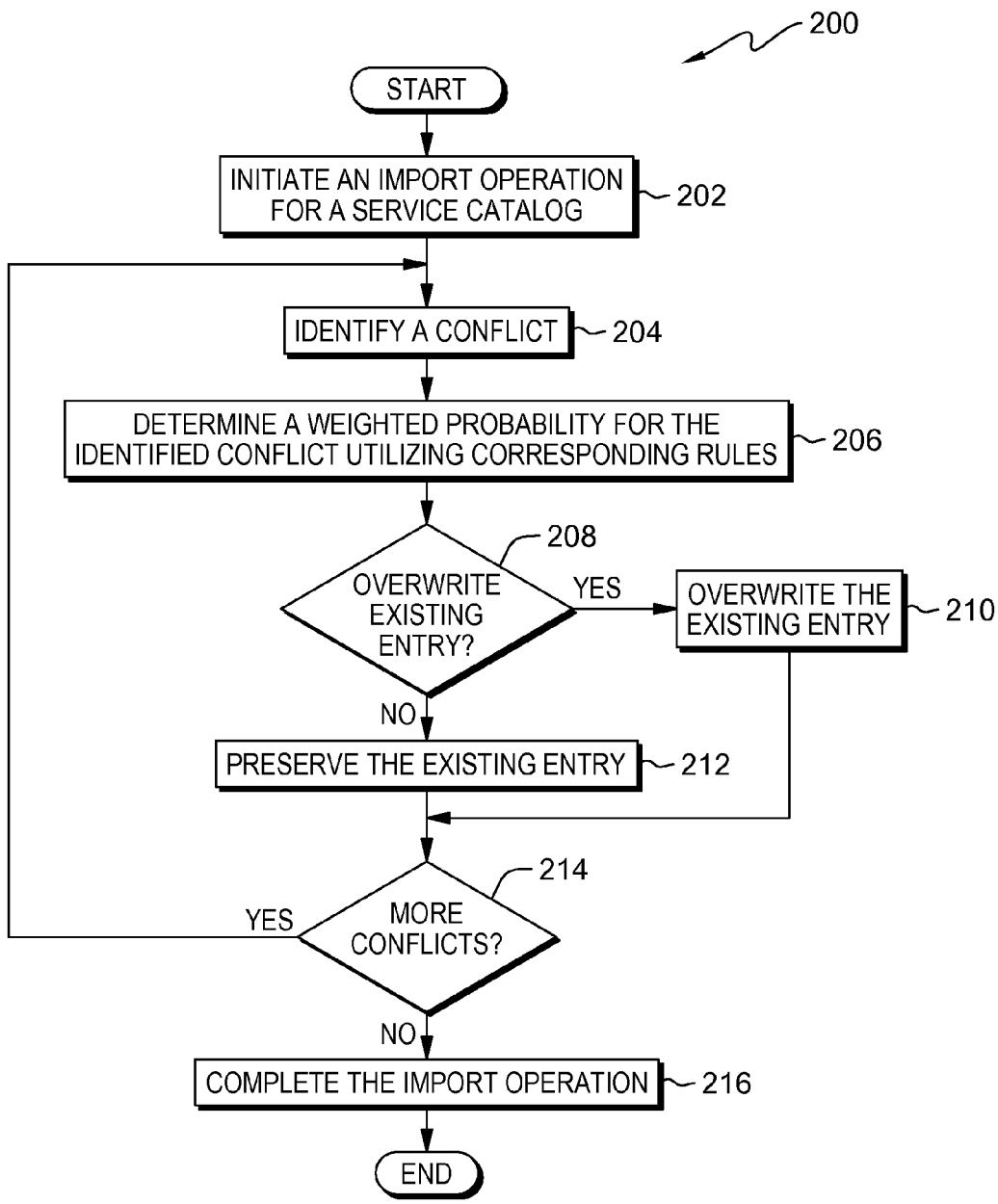
FIG. 2 is a flowchart depicting operational steps of a program for managing conflicts in an import operation for a software catalog, in accordance with embodiments of the present invention.

FIG. 2 is a flowchart depicting operational steps of conflict resolution program 200, a program for managing conflicts in an import operation for a software catalog, in accordance with embodiments of the present invention. In various embodiments, conflict resolution program 200 can initiate in response to a user request (e.g., a user of computing device 120) or in response to an automated initiation of an import operation.

In step 202, conflict resolution program 200 initiates an import operation for a service catalog. In one embodiment, conflict resolution program 200 initiates in import operation of software catalog 132 into database 136. For example, conflict resolution program 200 receives a user request to perform the import operation, and the received request can include an indication of one or more rules in rules repository 134 to utilize (e.g., and corresponding weights). The import operation for the software catalog may denote a process of importing a software catalog into a computer system that already has software installed and that has a local software catalog installed (e.g., in database 136). In an example embodiment, the import operation can install a software catalog on a server to run a software scan on client systems connected to the server. The software catalog may be used as a knowledge base for finding and identifying the software on the clients.

In step 204, conflict resolution program 200 identifies a conflict. In one embodiment, conflict resolution program 200 identifies a conflict between entries in software catalog 132 and database 136 during the import operation. In an example embodiment, during the import operation of software catalog 132 into database 136, conflict resolution program 200 identifies a conflict which occurs when a duplicate exists between software catalog 132 and database 136. For example, conflict resolution program 200 can identify a conflict when: the same signature is utilized to identify different instances of software, the same signature is utilized on different platforms, the same software release has a different parent version, the same software version has a different parent product, etc.

In step 206, conflict resolution program 200 determines a weighted probability for the identified conflict utilizing corresponding rules. In one embodiment, conflict resolution program 200 determines a weighted probability for the identified conflict (from step 204) utilizing one or more rules (i.e., in rules repository 134) that are associated with the type of conflict and/or indicated in a request for the import operation. Conflict resolution program 200 calculated a probablity for each conflict in the import operation separately. Conflict resolution program 200 determines a probability for each corresponding rule (e.g., each indicated rule, which may be all the rules or a subset of the rules in rules repository 134), applies the respective weights to the determined probabilities, and sums the weighted probabilities to determine the weighted probability for the conflict. For example, conflict resolution program 200 utilizes an algorithm, such as: "$Weight_1(Rule_1)+Weight_2(Rule_2)+Weight_3(Rule_3)+Weight_4(Rule_4)+ \ldots +Weight_n(Rule_n)$, Weighted Probability."

Rules repository 134 can include a variety of different rules that conform to rule definitions that are associated with conflict resolution program 200 (e.g., rules defining a normalized probability). A first example rule is to determine the percentage of historical selections to preserve the existing value instead of using the incoming value for the entry in conflict. For example, conflict resolution program 200 analyzes historical decisions made for conflicts on the given element. If conflict resolution program 200 identifies more decisions to preserve the existing value, then conflict resolution program 200 outputs a probability greater than 0.5 (to preserve the value). If conflict resolution program 200 identifies more decisions to use the incoming value, then conflict resolution program 200 outputs a probability less than 0.5 (to preserve the value). A second example rule is to determine the percentage of historical selections to preserve the ancestors of the conflicting entry. A third example rule is to determine the percentage of historical selections to preserve the descendants of the conflicting entry.

A fourth example rule is to compare the modification data of the entry being in conflict. For example, conflict resolution program 200 determines a 1 or 0 probability depending on whether the data in the imported catalog is older or newer than the date in the existing database. A fifth example rule is to utilize a pre-defined probability depending on an ID of the user that modified the conflicting element. For example, conflict resolution program 200 utilizes information about users that have edited database 136 and/or software catalog 132 (e.g., user experience, etc.). A sixth example rule is to utilize certain assigned probabilities for certain expressions. For example, conflict resolution program 200 identifies regular expressions in the conflicting element (e.g., a conflicting signature with an .exe extension) and assigns a probability based on one or more of the identified regular expressions. A seventh example rule is to determine whether the conflicting entry is associated with a tag that indicates "use existing," "use incoming," etc. In additional embodiments, rules repository 134 includes additional rules that conflict resolution program 200 can utilize.

In decision step 208, conflict resolution program 200 determines whether to overwrite the existing entry. In one embodiment, conflict resolution program 200 compares the determined weighted probability (from step 206) to a threshold to determine whether to overwrite the existing entry. In various embodiments, the determined probability provides an indication of whether to preserve the existing value, or whether to import the incoming value and overwrite the existing entry. In an example where the determined probability provides an indication of whether to preserve the existing value when the determined weighted probability is greater than 0.5, a decision to preserve the existing entry is "more probable" than a decision to use the incoming value.

Conflict resolution program 200 can utilize multiple thresholds to determine whether to overwrite the existing entry. In an example embodiment, conflict resolution program 200 compares the determined weighted probability to a predefined threshold of 0.75, and when the determined weighed probability is greater than 0.75, conflict resolution program 200 determines to preserve the existing entry in database 136. However, if the determined weighted probability is less than the threshold of 0.75 but greater than 0.5 (e.g., or another predefined threshold), then conflict resolution program 200 can provide a prompt to a user associated with the import operation (or database 136) to determine whether to overwrite the existing entry.

In step 210, conflict resolution program 200 overwrites the existing entry. More specifically, in response to determining to overwrite the existing entry (decision step 208, yes branch), conflict resolution program 200 overwrites the existing entry with the incoming entry. Conflict resolution program 200 resolves the conflict (identified in step 204) by overwriting the exiting entry in database 136 with the incoming information in software catalog 132 (for the conflicting entry). Conflict resolution program 200 can then proceed to identify another conflict (if one exists).

In step 212, conflict resolution program 200 preserves the existing entry. More specifically, in response to determining not to overwrite the existing entry (decision step 208, no branch), conflict resolution program 200 preserves the existing entry. Conflict resolution program 200 resolves the conflict (identified in step 204) by preserving the exiting entry in database 136 and disregarding the incoming information from software catalog 132 (for the conflicting entry). Conflict resolution program 200 can then proceed to identify another conflict (if one exists).

In decision step 214, conflict resolution program 200 determines whether more conflicts exist in the import operation. In one embodiment, conflict resolution program 200 determines whether additional conflicts exist for the import operation of software catalog 132 into database 136. For example, conflict resolution program 200 determines whether conflict resolution program 200 can identify any additional conflicts. In response to determining that more conflicts do exist in the import operation (decision step 214, yes branch), conflict resolution program 200 returns to step 204 and identifies another conflict in the import operation.

In step 216, conflict resolution program 200 completes the import operation. More specifically, in response to determining that no more conflicts exist in the import operation (decision step 214, no branch), conflict resolution program 200 completes the import operation. Conflict resolution program 200 continues the import operation (initiated in step 202) and proceeds until the import operation completes (since no more conflicts exist in the import operation).

Figure 3:
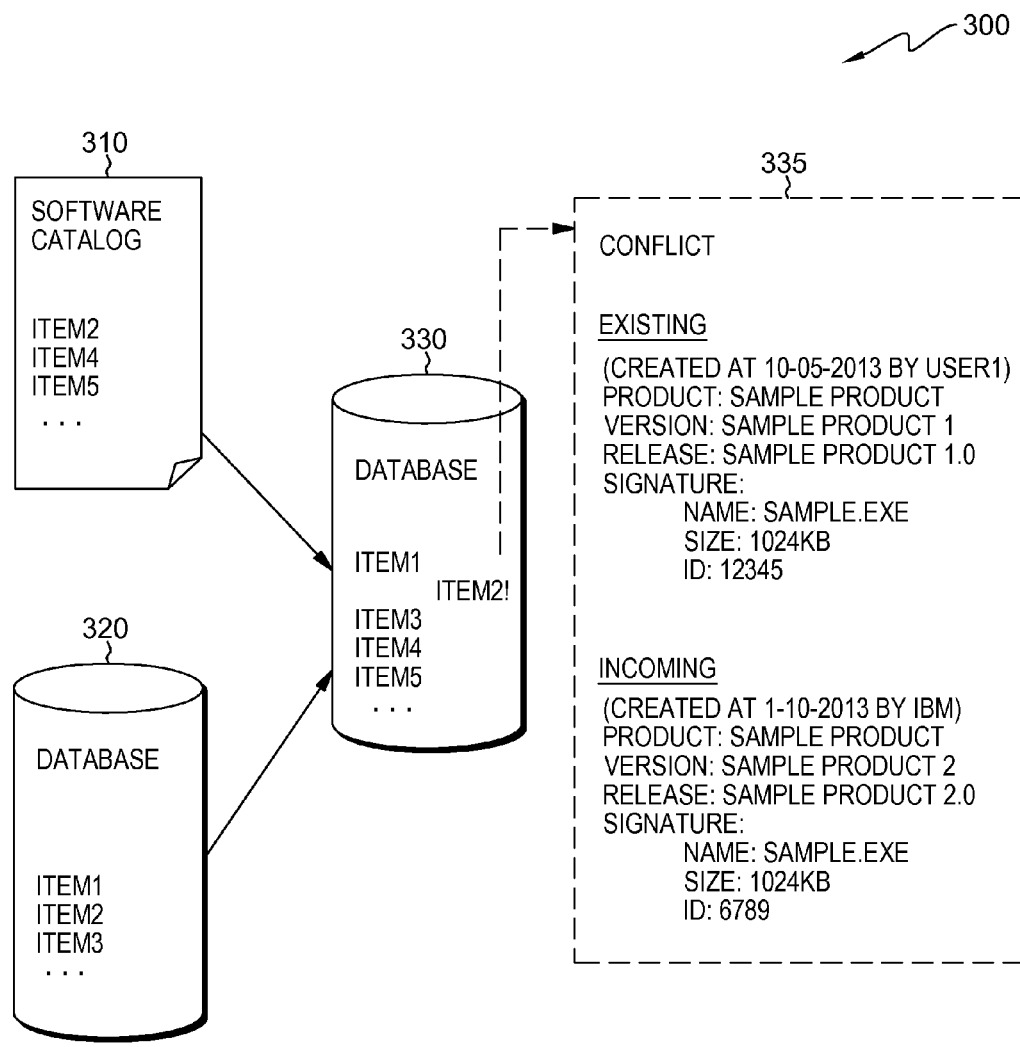
FIG. 3 is an example block diagram of elements of an import operation and an example conflict that can occur during the import operation, in accordance with embodiments of the present invention.

FIG. 3 depicts sample import conflict 300, an example block diagram of elements of an import operation and an example conflict that can occur during the import operation, in accordance with embodiments of the present invention.

Sample import conflict 300 includes software catalog 310, database 320, database 330, and conflict 335. Software catalog 310 can be a collection of information about software that may be installed on a computer system or that may have to be installed on a computer system, such as software catalog 132. Software catalog 310 includes a plurality of software items and associated data, such as item2, item4, and item5. Database 320 is an existing database including software (e.g., database 136) that is the target of an import operation of software catalog 310. Database 320 includes a plurality of software items and associated data, such as item1, item2, and item3. Database 330 is a database that includes software and data as the result of the merge operation of software catalog 310 into database 320. As a result of the import operation, database 330 includes conflict 335.

Conflict 335 occurs in the import operation because both software catalog 310 and database 320 include item2. The conflict for item2 is represented in database 330 as "item2!" in database 330. The information associated with conflict 335 describes the information associated with the "existing" entry of item2 in database 320 and the "incoming" entry of item2 from software catalog 310. The attributes indicate differences that can lead to conflicts, such as a different product version (i.e., 1 and 2), a different product release (i.e., 1.0 and 2.0), a different originator (i.e., User1 and IBM), and a different ID (i.e., 12345 and 6789). The attributes can also indicate information that can be identical, such as the product (i.e., sample product).

In this example, instead of prompting a user associated with the import operation for input, conflict resolution program 200 utilizes rules in rules repository 134 to determine whether to use the existing or incoming instance of item2. In one scenario, conflict resolution program 200 utilizes three rules from rules repository 134 (e.g., based on an indication from a user) to determine a weighted probability (step 206).

For the first rule, conflict resolution program 200 utilizes a predefined percentage that depends on the ID of the user that triggered the import operation (a corresponding weight value of 0.3). Conflict resolution program 200 identifies a probability of 0.2 for "User1" (i.e., the existing entry) and a probability of 0.8 for "IBM" (i.e., the incoming entry). To determine the normalized (i.e., weighted) probability to "use existing" for the first rule, conflict resolution program 200 multiplies the determined probability for the first rule by the corresponding weight for the first rule, i.e., 20%×0.3=6%.

For the second rule, conflict resolution program 200 determines a percentage of historical selections to preserve the existing value instead of utilizing the incoming value (a corresponding weight value of 0.5). Conflict resolution program 200 analyzes information associated with previous import operations on database 320 and determines that the decision to "preserve existing value" occurred 66% of the time. To determine the normalized (i.e., weighted) probability to "use existing" for the second rule, conflict resolution program 200 multiplies the determined probability for the second rule by the corresponding weight for the second rule, i.e., 66%×0.5=33%.

For the third rule, conflict resolution program 200 compares the modification data for the existing entry to the modification data for the incoming entry (a corresponding weight value of 0.2). Conflict resolution program 200 determines that the modification date of the existing entry of item2 is older than the modification date of the incoming entry of item2 (i.e., Oct. 5, 2013 compared to May 10, 2013). Therefore, conflict resolution program 200 determines a probability of 0% (e.g., if the existing entry is newer than the incoming entry, then conflict resolution program 200 determines a probability of 100%). To determine the normalized (i.e., weighted) probability to "use existing" for the third rule, conflict resolution program 200 multiplies the determined probability for the third rule by the corresponding weight for the third rule, i.e., 0%×0.2=0%.

Conflict resolution program 200 determines a total weighted probability (for step 206) to "use existing" in the import operation to be 39% (i.e., 20%(0.3)+66%(0.5)+0% (0.2)=39%). Further, conflict resolution program 200 utilizes a threshold value of 60% to determine whether to overwrite the existing entry of item2 (decision step 208). Since the probability for "use existing" is 39%, the probability of "use incoming" is 61% (i.e., 100%-31%). Conflict resolution program 200 determines that the probability for "use incoming" is higher than the threshold (decision step 208, yes branch). Therefore, conflict resolution program 200 automatically overwrites the existing entry of item2 in database 320 with the incoming entry of item2 (i.e., "sample product 2.0") from software catalog 310 (step 212).

In another embodiment, if conflict resolution program 200 is utilizing a threshold of 70% and neither probability is greater than the threshold (i.e., 39% and 61%), then conflict resolution program 200 can determine whether either determined weighted probability is more probable (e.g., greater than 50% or another predefined threshold probability). In response to determining that a probability is more probable, conflict resolution program 200 provides a prompt (e.g., to a user associated with the import operation) requesting input to resolve the conflict. In one embodiment, conflict resolution program 200 provides a prompt that provides an indication or recommendation of which entry to choose (e.g., "use incoming has a corresponding probability of 61%," etc.). In another embodiment, if conflict resolution program 200 determined that neither weighted probability is more probable (e.g., both 50% or not a significant difference), then conflict resolution program 200 provides a prompt that can indicate that neither option is more probable.

Figure 4:
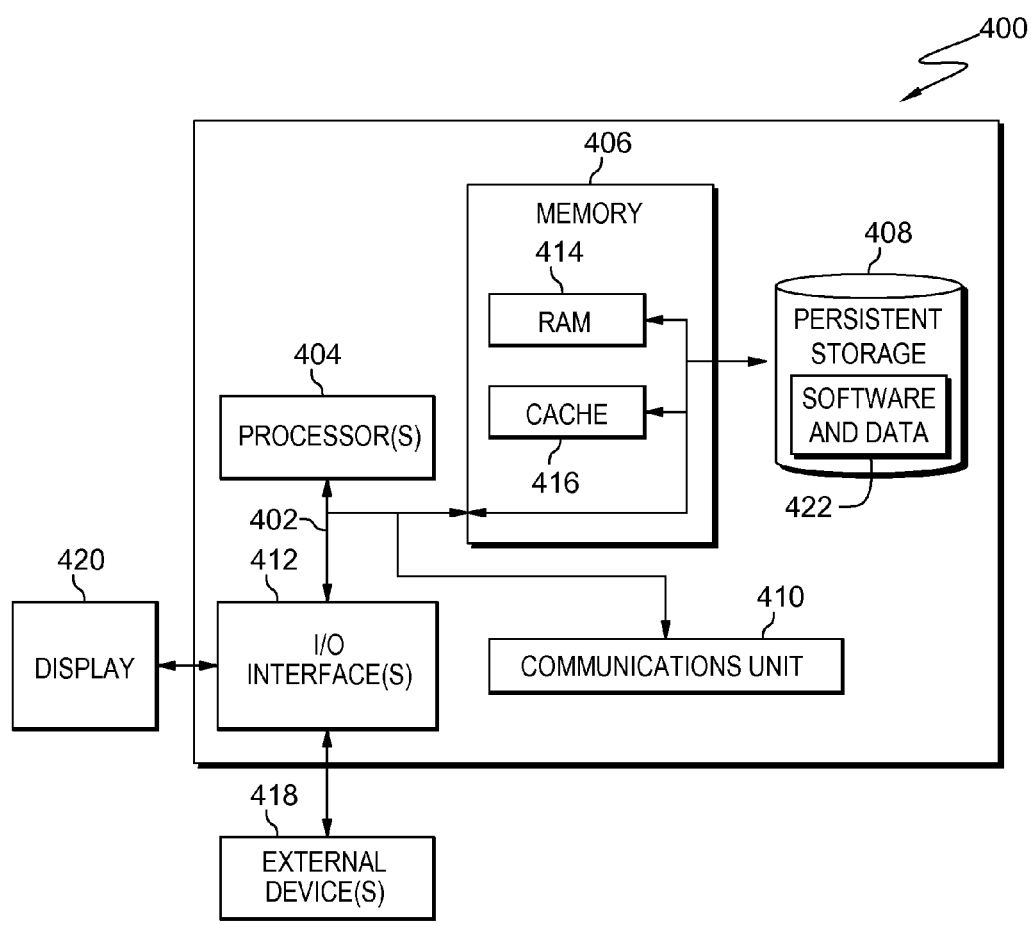
FIG. 4 depicts a block diagram of components of a computing system representative of the client device and server of FIG. 1, in accordance with an embodiment of the present invention.

FIG. 4 depicts computer system 400, which is representative of computing device 120 and server 130, in accordance with an illustrative embodiment of the present invention. It should be appreciated that FIG. 4 provides only an illustration of one implementation and does not imply any limitations with regard to the environments in which different embodiments may be implemented. Computer system 400 includes processor(s) 404, cache 416, memory 406, persistent storage 408, communications unit 410, input/output (I/O) interface(s) 412, and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of processor(s) 404 by holding recently accessed data, and data near recently accessed data, from memory 406.

Program instructions and data (e.g., software and data 422) used to practice embodiments of the present invention may be stored in persistent storage 408 and in memory 406 for execution by one or more of the respective processor(s) 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408. Software and data 422 can be stored in persistent storage 408 for access and/or execution by one or more of the respective processor(s) 404 via cache 416. With respect to server 130, software and data 422 includes software catalog 132, rules repository 134, database 136, and conflict resolution program 200.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data (e.g., software and data 422) used to practice embodiments of the present invention may be downloaded to persistent storage 408 through communications unit 410.

I/O interface(s) 412 allows for input and output of data with other devices that may be connected to each computer system. For example, I/O interface(s) 412 may provide a connection to external device(s) 418, such as a keyboard, a keypad, a touch screen, and/or some other suitable input device. External device(s) 418 can also include portable computer readable storage media, such as, for example, thumb drives, portable optical or magnetic disks, and memory cards. Program instructions and data (e.g., software and data 422) used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing conflicts in an import operation, the method comprising:
   identifying, by one or more processors, a conflict in an import operation of an incoming set of data into an existing database, wherein the incoming set of data includes an incoming entry, and the existing database includes an existing entry that corresponds to the identified conflict;
   determining, by one or more processors, a probability to preserve the existing entry in the existing database based on a set of rules associated with the import operation; and
   determining, by one or more processors, whether to overwrite the existing entry in the existing database with the incoming entry from the incoming set of data based on comparing the determined probability to a threshold probability.

2. The method of claim 1, further comprising:
   responsive to determining to overwrite the existing entry in the existing database with the incoming entry from the incoming set of data based on comparing the determined probability to the threshold probability, importing, by one or more processors, the incoming entry from the incoming set of data into the existing database and overwriting the existing entry in the existing database with the incoming entry from the incoming set of data.

3. The method of claim 1, further comprising:
   responsive to determining to not overwrite the existing entry in the existing database with the incoming entry from the incoming set of data based on comparing the determined probability to the threshold probability, preserving, by one or more processors, the existing entry in the existing database instead of utilizing the incoming entry from the incoming set of data.

4. The method of claim 1:
   wherein the import operation is a user-initiated import operation that includes a definition to utilize a set of one or more defined rules; and
   wherein the incoming set of data is included in a software catalog to be installed on the existing database.

5. The method of claim 1, wherein determining whether to overwrite the existing entry in the existing database with the incoming entry from the incoming set of data based on comparing the determined probability to the first threshold probability further comprises:
   comparing, by one or more processors, the determined probability to the threshold probability, wherein the threshold probability indicates whether to automatically overwrite the existing entry in the existing database with the incoming entry from the incoming set of data;
   determining, by one or more processors, that the determined probability does not meet the threshold probability; and providing, by one or more processors, a prompt to receive a selection of whether to overwrite the existing entry in the existing database with the incoming entry from the incoming set of data, wherein the provide prompt includes a recommendation that indicates the determined probability.

6. The method of claim 1, wherein at least one rule in the set of rules is based on a percentage of historical selections to preserve the existing entry in the existing database.

7. The method of claim 1, wherein at least one rule in the set of rules is based on one of:
- a percentage of historical selections to preserve an existing entry corresponding to an ancestor entry of the existing entry in the existing database; and
- a percentage of historical selections to preserve an existing entry corresponding to a descendant entry of the existing entry in the existing database.

8. The method of claim 1, wherein at least one rule in the set of rules is based on a modification date of the existing entry in the existing database in comparison to a modification date of the incoming entry from the incoming set of data.

9. The method of claim 1, wherein at least one rule in the set of rules is based on probabilities associated with user identifiers assigned to the existing entry in the existing database and the incoming entry in the incoming set of data.

10. A computer program product for managing conflicts in an import operation, the computer program product comprising:
- one or more computer readable storage media and program instructions stored on the one or more computer readable storage media, the program instructions comprising:
- program instructions to identify a conflict in an import operation of an incoming set of data into an existing database, wherein the incoming set of data includes an incoming entry, and the existing database includes an existing entry that corresponds to the identified conflict;
- program instructions to determine a probability to preserve the existing entry in the existing database based on a set of rules associated with the import operation; and
- program instructions to determine whether to overwrite the existing entry in the existing database with the incoming entry from the incoming set of data based on comparing the determined probability to a threshold probability.

11. The computer program product of claim 10, further comprising program instructions, stored on the one or more computer readable storage media, to:
- responsive to determining to overwrite the existing entry in the existing database with the incoming entry from the incoming set of data based on comparing the determined probability to the threshold probability, import the incoming entry from the incoming set of data into the existing database and overwriting the existing entry in the existing database with the incoming entry from the incoming set of data.

12. The computer program product of claim 10, further comprising program instructions, stored on the one or more computer readable storage media, to:
- responsive to determining to not overwrite the existing entry in the existing database with the incoming entry from the incoming set of data based on comparing the determined probability to the threshold probability, preserve the existing entry in the existing database instead of utilizing the incoming entry from the incoming set of data.

13. The computer program product of claim 10:
- wherein the import operation is a user-initiated import operation that includes a definition to utilize a set of one or more defined rules; and
- wherein the incoming set of data is included in a software catalog to be installed on the existing database.

14. The computer program product of claim 10, wherein the program instructions to determine whether to overwrite the existing entry in the existing database with the incoming entry from the incoming set of data based on comparing the determined probability to the first threshold probability further comprise program instructions to:
- compare the determined probability to the threshold probability, wherein the threshold probability indicates whether to automatically overwrite the existing entry in the existing database with the incoming entry from the incoming set of data;
- determine that the determined probability does not meet the threshold probability; and
- provide a prompt to receive a selection of whether to overwrite the existing entry in the existing database with the incoming entry from the incoming set of data, wherein the provide prompt includes a recommendation that indicates the determined probability.

15. The computer program product of claim 10, wherein at least one rule in the set of rules is based on one of:
- a percentage of historical selections to preserve the existing entry in the existing database;
- a percentage of historical selections to preserve an existing entry corresponding to an ancestor entry of the existing entry in the existing database;
- a percentage of historical selections to preserve an existing entry corresponding to a descendant entry of the existing entry in the existing database;
- a modification date of the existing entry in the existing database in comparison to a modification date of the incoming entry from the incoming set of data; and
- probabilities associated with user identifiers assigned to the existing entry in the existing database and the incoming entry in the incoming set of data.

16. A computer system for managing conflicts in an import operation, the computer system comprising:
- one or more computer processors;
- one or more computer readable storage media; and
- program instructions stored on the computer readable storage media for execution by at least one of the one or more processors, the program instructions comprising:
- program instructions to identify a conflict in an import operation of an incoming set of data into an existing database, wherein the incoming set of data includes an incoming entry, and the existing database includes an existing entry that corresponds to the identified conflict;
- program instructions to determine a probability to preserve the existing entry in the existing database based on a set of rules associated with the import operation; and
- program instructions to determine whether to overwrite the existing entry in the existing database with the incoming entry from the incoming set of data based on comparing the determined probability to a threshold probability.

17. The computer system of claim 16, further comprising program instructions, stored on the computer readable storage media for execution by at least one of the one or more processors, to:

responsive to determining to overwrite the existing entry in the existing database with the incoming entry from the incoming set of data based on comparing the determined probability to the threshold probability, import the incoming entry from the incoming set of data into the existing database and overwriting the existing entry in the existing database with the incoming entry from the incoming set of data.

18. The computer system of claim 16, further comprising program instructions, stored on the computer readable storage media for execution by at least one of the one or more processors, to:

responsive to determining to not overwrite the existing entry in the existing database with the incoming entry from the incoming set of data based on comparing the determined probability to the threshold probability, preserve the existing entry in the existing database instead of utilizing the incoming entry from the incoming set of data.

19. The computer system of claim 16, wherein the program instructions to determine whether to overwrite the existing entry in the existing database with the incoming entry from the incoming set of data based on comparing the determined probability to the first threshold probability further comprise program instructions to:

compare the determined probability to the threshold probability, wherein the threshold probability indicates whether to automatically overwrite the existing entry in the existing database with the incoming entry from the incoming set of data;

determine that the determined probability does not meet the threshold probability; and provide a prompt to receive a selection of whether to overwrite the existing entry in the existing database with the incoming entry from the incoming set of data, wherein the provide prompt includes a recommendation that indicates the determined probability.

20. The computer system of claim 16, wherein at least one rule in the set of rules is based on one of:

a percentage of historical selections to preserve the existing entry in the existing database;

a percentage of historical selections to preserve an existing entry corresponding to an ancestor entry of the existing entry in the existing database;

a percentage of historical selections to preserve an existing entry corresponding to a descendant entry of the existing entry in the existing database;

a modification date of the existing entry in the existing database in comparison to a modification date of the incoming entry from the incoming set of data; and probabilities associated with user identifiers assigned to the existing entry in the existing database and the incoming entry in the incoming set of data.

* * * * *